(12) United States Patent
Johnson et al.

(10) Patent No.: US 6,209,796 B1
(45) Date of Patent: Apr. 3, 2001

(54) HEATER PLENUM ASSEMBLY FOR UTILITY VEHICLE

(75) Inventors: Frank A. Johnson, Evans; Thomas E. Whitlock, Grovetown; Thomas M. Saxon, Waynesboro, all of GA (US)

(73) Assignee: Club Car, Inc., Augusta, GA (US)

( * ) Notice: Subject to any disclaimer, the term of this patent is extended or adjusted under 35 U.S.C. 154(b) by 0 days.

(21) Appl. No.: 09/513,115

(22) Filed: Feb. 25, 2000

(51) Int. Cl.[7] .................................................. B60H 1/02
(52) U.S. Cl. .............................. 237/12.3 A; 237/12.3 C; 165/41
(58) Field of Search ..................... 237/12.3 C, 12.3 A, 237/12.3 R; 165/41

(56) References Cited

U.S. PATENT DOCUMENTS

| Re. 26,599 | 6/1969 | Fairbanks et al. |
|---|---|---|
| 670,080 | 10/1901 | Kempshall . |
| 867,271 | 3/1907 | Hofmann . |
| 964,921 | 7/1910 | Laughlin . |
| 1,028,553 | 6/1912 | Dilks et al. . |
| 1,063,647 | 6/1913 | Brigel . |
| 1,102,432 | 7/1914 | Pelton . |
| 1,166,630 | 1/1916 | Prettyman . |
| 1,309,216 | 7/1919 | Pelton . |
| 1,600,219 | 9/1926 | Eulberg . |
| 1,658,047 | 2/1928 | Healy . |
| 1,910,565 | 5/1933 | Refsgaard . |
| 3,034,098 | 7/1962 | Hannon . |
| 4,140,173 | * 2/1979 | Wulf et al. ........................ 165/104 S |
| 4,415,118 | 11/1983 | Endo . |
| 4,667,876 | * 5/1987 | Negishi ............................ 237/12.3 A |
| 5,622,311 | * 4/1997 | Huston et al. ................... 237/12.3 C |

* cited by examiner

*Primary Examiner*—Harold Joyce
*Assistant Examiner*—Derek S. Boles
(74) *Attorney, Agent, or Firm*—Michael Best & Friedrich LLP

(57) ABSTRACT

A vehicle heating system includes a heater plenum assembly externally attached to an engine exhaust pipe, to use exhaust heat to heat outside air flowing through the plenum into passenger cabin. The plenum includes a plurlality of aluminum plenum air tubes fastened to an air inlet manifold and air outlet manifold, with the assembly fastened against a portion of the exhaust pipe. A blower circulates unheated outside air through the plenum and, thereafter, the heated air into the cabin. Insulation around the plenum and adjacent exhaust pipe conserves heat.

9 Claims, 2 Drawing Sheets

HEATER PLENUM ASSEMBLY FOR UTILITY VEHICLE

BACKGROUND OF THE INVENTION

Small, lightweight, mobile utility vehicles, powered by internal combustion engines, are widely used in industrial and commercial settings and off-road applications. Such vehicles are commonly found in outdoor, or other unheated environments, such as at airports or warehouses. Such applications require that the passenger cabins be heated without extensive heating systems. It is well known to use the exhaust gas heat to heat outside air and move it into the passenger cabin. The air-carrying tubes in such systems must be readily accessible for inspection, service and replacement when needed. Prior art heating systems can be relatively inaccessible, too complicated to service or not sufficiently resistant to corrosive conditions in the exhaust systems.

The foregoing illustrates limitations know to exist in prior art utility vehicle heating systems. Thus, it is apparent that it would be advantageous to provide an alternative directed to overcoming one or more of theses limitations set forth above. Accordingly, a suitable alternative is provided including the features more fully disclosed hereinafter.

SUMMARY OF THE INVENTION

In one aspect of the present invention this is accomplished by providing a mobile vehicle having an improved heating system with a heater plenum assembly mounted on an exhaust pipe portion for heating air for the passenger cabin; the plenum assembly comprising: a plurality of individual air-carrying plenum tubes, each tube having an air entry end and an air exit end; a first adapter flange means fastened to the air entry end of the plenum tubes for rigidly holding the plenum tubes in a predetermined orientation to each other, the first flange means forming an air inlet manifold for the air entry end; a second adapter flange means fastened to the air exit end of the plenum tubes, for rigidly holding the plenum tubes in the predetermined orientation to each other, the second flange means forming an air outlet manifold for the air exit end; the predetermined orientation of the plenum tubes being such that: the plenum tubes extend substantially parallel to each other; each plenum tube substantially contacts at least one adjacent plenum tube; and when the plenum assembly is placed on a portion of the exhaust pipe, the plenum tubes substantially conform to the exhaust pipe outside diameter curvature, while contacting the exhaust pipe with at least one plenum tube; and blower means for drawing unheated air in through an exterior air inlet, moving the air through the plenum assembly and moving the air into the passenger cabin through a cabin air outlet;

DETAILED DESCRIPTION

Figure 1:
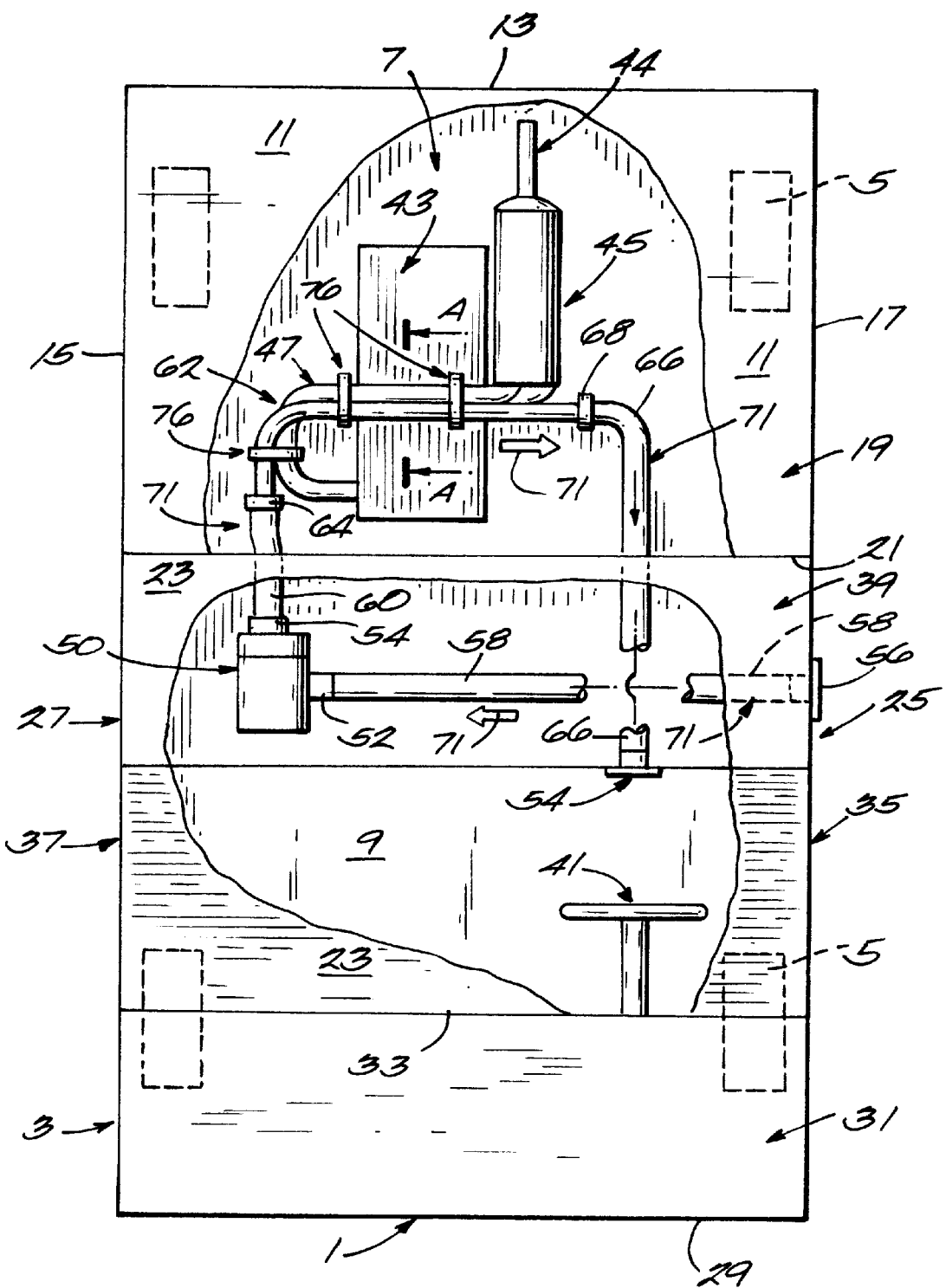
FIG. 1 is a schematic plan view, partially in cross section, with parts removed, of a vehicle incorporating the invention.

FIG. 1 shows vehicle 1 with frame member 3 carried on wheels 5 (in dotted lines). Vehicle 1 is separated into two separate compartments; an engine compartment 7 and a passenger cabin 9. Engine compartment 7 is covered by compartment floor 11 and enclosed by rear wall 13 and sidewalls 15,17 that extend upwardly a short distance to form an open, truck-type cargo bed (generally 19). Intermediate wall 21 separates engine compartment 7 and cabin 9. Wall 21 extends upwardly to a roof 23 that covers cabin 9. Cabin 9 is a conventional cabin formed by sidewalls 25, 27 and front wall 29. Cowling 31 slants upwardly to window 33, which extends upwardly to roof 23. Doors 35, 37 are located in sidewalls 25, 27 respectively. Within cabin 9 is bench seat 39, steering wheel 41 and other conventional elements, including but not limited to, accelerator, brake pedal and storage areas (not shown).

Beneath engine compartment floor 11 is located a conventional combustion engine 43, and exhaust system for combustion products, including but not limited to a tail pipe 44, muffler 45 and engine exhaust pipe 47. The elements 1–47 are conventional in design and materials, with the exhaust pipe 47 being from a cold rolled, commercial quality, ductile, low carbon steel alloy (AISI C1010 TO C1018), as is well known.

The invention will now be described. Positioned beneath seat 39 is a conventional, electrically powered centrifugal blower 50 having a blower inlet 52 and blower outlet 54. Exterior air inlet vent 56 is positioned in sidewall 25 and connected to blower inlet by first duct hose 58. Blower outlet 54 is connected by second duct hose 60 to plenum 62 at first adapter flange 64. Plenum 62 is connected by third duct hose 66 extending between second adapter flange 68 and cabin air outlet 54. Each adapter flange 64,68 forms an air manifold 70 for plenum 62 as described hereinbelow.

Figure 2:
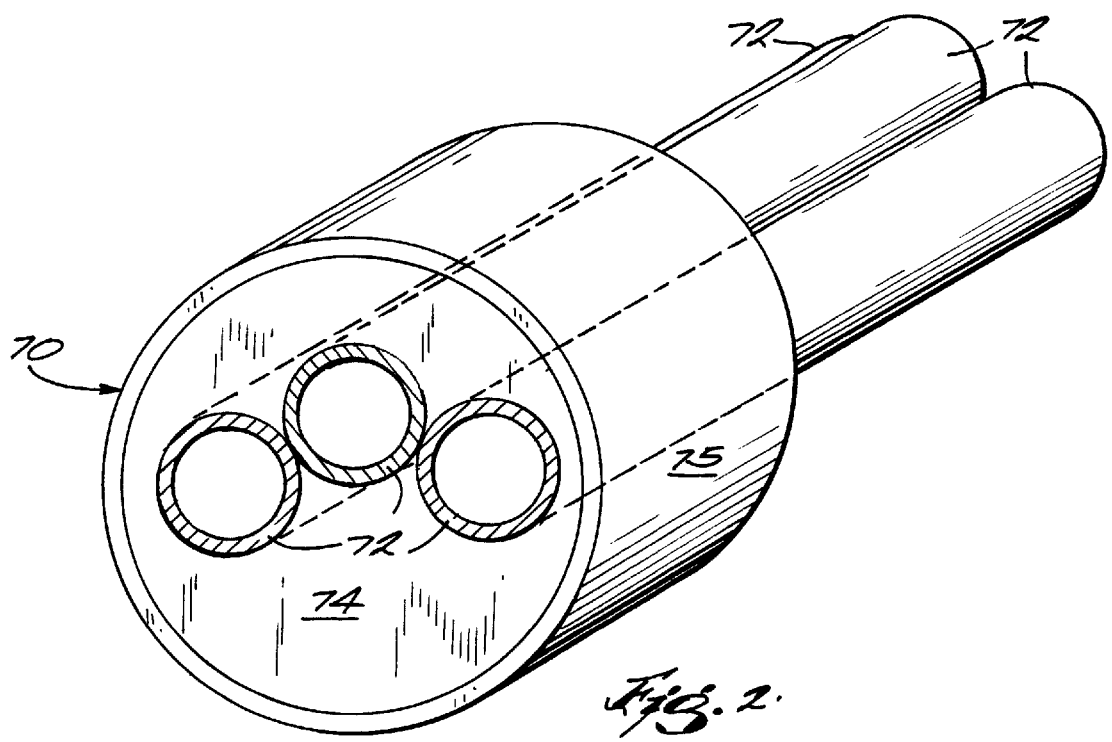
FIG. 2 is a schematic, perspective view of an air manifold assembly of the invention, with parts removed.

FIG. 2 shows a schematic perspective of an air manifold 70 formed by a plurality of plenum tubes 72 welded to end plate 74 of each adapter flange 64, 68. Each manifold is constructed the same, so a description for one serves for both. The end plate 74 and flange sidewall 76 form a tubular inlet and outlet manifold, when connected in air tight condition to duct hoses 60, 66. Hoses 60, 66 are connected to adapter flange sidewall 76 by a conventional hose clamp 76. Between inlet and outlet manifolds 70 plenum tubes 72 extend substantially parallel to the exhaust pipe 47.

Figure 3:
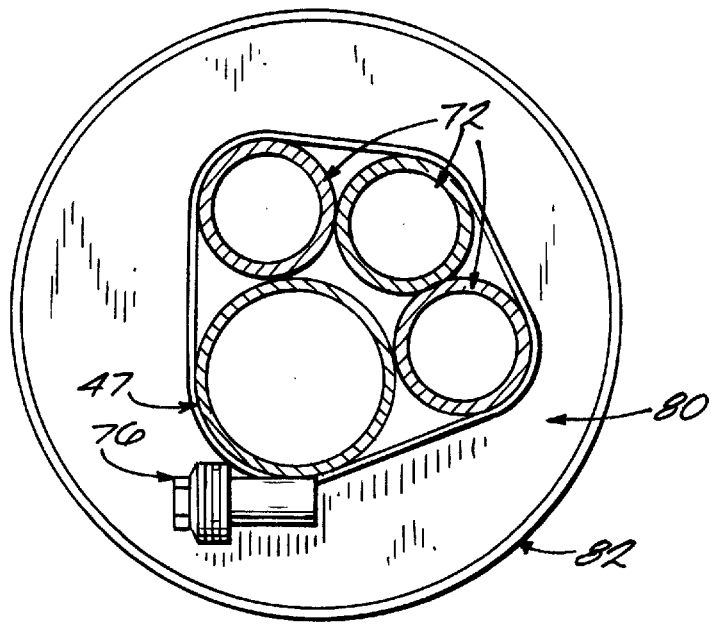
FIG. 3 is a cross section along line A—A of FIG. 1.

As shown in FIG. 3, plenum tubes 72 are oriented in a predetermined arcuate relation to each other so as to conform to the arcuate outside circumference of the exhaust pipe 47 against which the plenum 62 is to be fastened. We prefer three plenum tubes 72, with each plenum tube in substantial contact with an adjacent plenum tube and at least one (preferably two) plenum tubes 72 in substantial contact with the exhaust pipe 47, for enhanced heat recovery. Other arrangements and numbers of tubes 72 will work. Plenum 62 is connected to exhaust pipe 47 by at least one hose clamp 76 between adapter flanges 64, 68.

An insulation cover 80 is provided concentricall around plenum assembly 62 and exhaust pipe 47. An outer physical protective cover 82 may be provided around insulation cover 80.

We prefer to provide plenum tubes 72 from aluminum alloy designated as 6061 T6, with a 0.760 inch O.D., and 0.0625 wall thickness. We have found that the hardness must be a minimum of at least 12 Webster "B" to sufficiently withstand, for acceptable operating time, the galvanic corrosion that might occur between contact of aluminum and a ferrous alloy exhaust pipe 47. Lower hardness tends to develop pinholes prematurely in the plenum tube walls.

We prefer the duct hose 58, 60, 66 to be silicon/fiberglass supported by a fully enclosed spring steel wire helix, to withstand a temperature range of −80° F. to 6000° F. Supplied by Flexfab Company, Hastings, Mich. under designation Series FLX2005.

We prefer the hose clamps 76 supplied by Breeze Industrial Products, Saltsburg, Pa., under Part No. CT9432.

Thus, it can be understood that the invention provides a heater plenum assembly with reduced tendency toward corrosion, but readily accessible for quick removal and servicing.

Having described the invention, what is claimed is:

1. In a mobile vehicle having a passenger cabin and an engine compartment, the engine compartment having an internal combustion engine for power, an exhaust system with an exhaust pipe for combustion products and a muffler for noise suppression, an improved heating system for heating the passenger cabin comprising:
   (A) a heater plenum assembly mounted on an exhaust pipe portion for heating air for the passenger cabin; said plenum assembly comprising:
      (1) a plurality of individual air-carrying plenum tubes, each tube having an air entry end and an air exit end;
      (2) a first adapter flange means fastened to said air entry end of said plenum tubes for rigidly holding said plenum tubes in a predetermined orientation to each other, said first flange means forming an air inlet manifold for said air entry end;
      (3) a second adapter flange means fastened to said air exit end of said plenum tubes, for rigidly holding said plenum tubes in said predetermined orientation to each other, said second flange means forming an air outlet manifold for said air exit end; and
      (4) said predetermined orientation of said plenum tubes being such that:
         (a) said plenum tubes extend substantially parallel to each other;
         (b) each plenum tube substantially contacts at least one adjacent plenum tube; and
         (c) when said plenum assembly is placed on a portion of said exhaust pipe, said plenum tubes substantially conform to said exhaust pipe outside diameter curvature, while contacting said exhaust pipe with at least one plenum tube; and
   (B) blower means for:
      (1) drawing unheated air in through an exterior air inlet;
      (2) moving said air through said plenum assembly; and
      (3) moving said air into said passenger cabin through a cabin air outlet.

2. The heating system of claim 1 further comprising means for fastening said plenum assembly on a portion of said exhaust pipe.

3. The heating system of claim 2 further comprising insulation means concentrically mounted around said plenum assembly and said exhaust pipe, extending between said first and second adapter flange means, for conserving heat.

4. The heating system of claim 3 further comprising flexible air duct hose means for connecting said air blower means to said plenum assembly, to said external air inlet and to said cabin air outlet.

5. The heating system of claim 1 further comprising said plenum assembly being fastened to said exhaust pipe by at least one hose clamp positioned between said first and second adapter flanges.

6. The heating system of claim 5 further comprising an outer protective covering concentrically mounted around said heat insulation means.

7. The heating system of claim 6 wherein said plenum tubes are formed from an aluminum alloy and said exhaust pipe is formed from a plain carbon steel alloy.

8. The heating system of claim 7 wherein said plenum assembly comprises three tubes and wherein two of said tubes contact said exhaust pipe when said plenum assembly is fastened to said exhaust pipe.

9. The heating system of claim 7 wherein said alluminum alloy has a minimum hardness of at least 12 Webster "B".

\* \* \* \* \*